United States Patent
Onoue

(10) Patent No.: US 8,744,201 B2
(45) Date of Patent: Jun. 3, 2014

(54) IMAGE ENCODING APPARATUS AND METHOD

(75) Inventor: Osamu Onoue, Kanagawa (JP)

(73) Assignee: Samsung Electronics Co., Ltd. (KR)

( * ) Notice: Subject to any disclaimer, the term of this patent is extended or adjusted under 35 U.S.C. 154(b) by 349 days.

(21) Appl. No.: 13/328,559

(22) Filed: Dec. 16, 2011

(65) Prior Publication Data

US 2012/0155781 A1    Jun. 21, 2012

(30) Foreign Application Priority Data

Dec. 16, 2010  (JP) ................................ 2010/281037

(51) Int. Cl.
*G06K 9/36* (2006.01)

(52) U.S. Cl.
USPC ....... 382/238; 382/235; 375/240.02; 386/295

(58) Field of Classification Search
USPC ............... 382/235, 238; 375/240.02; 386/295
See application file for complete search history.

(56) References Cited

U.S. PATENT DOCUMENTS

| | | | | |
|---|---|---|---|---|
| 2008/0310745 | A1* | 12/2008 | Ye et al. | 382/238 |
| 2010/0118971 | A1* | 5/2010 | Tanida et al. | 375/240.23 |
| 2011/0243467 | A1 | 10/2011 | Igarashi | |

FOREIGN PATENT DOCUMENTS

JP    2010193097    9/2010

* cited by examiner

*Primary Examiner* — Chan Park
*Assistant Examiner* — Eueng-Nan Yeh
(74) *Attorney, Agent, or Firm* — The Farrell Law Firm, P.C.

(57) ABSTRACT

A Joint Photographic Experts Group Extended Range (JPEG-XR) image encoding apparatus and method changes a quantized value or a coefficient prediction method for each block, thereby dramatically improving processing speed of the apparatus.

8 Claims, 16 Drawing Sheets

|    | P1  | P2  | P3  |
|----|-----|-----|-----|
| P4 | P5  | P6  | P7  |
| P8 | P9  | P10 | P11 |
| P12| P13 | P14 | P15 |

FIG.4
(PRIOR ART)

STATE AT CERTAIN TIME

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| SCAN ORDER | P1 | P4 | P3 | P2 | P5 | P6 | P7 | P9 | P8 | P10 | P11 | P12 | P13 | P14 | P15 |
| SCAN TOTAL (ACCUMULATED NON-ZERO INFORMATION) | 40 | 37 | 35 | 35 | 31 | 26 | 25 | 24 | 22 | 22 | 22 | 13 | 11 | 10 | 5 |

FIG.5
(PRIOR ART)

| | 5 | 3 | 0 |
|---|---|---|---|
| 6 | 2 | 1 | 1 |
| 2 | 0 | 0 | 1 |
| 1 | 0 | 0 | 0 |

FIG.6
(PRIOR ART)

SEQUENTIAL UPDATE RESULTS OF NON-ZERO INFORMATION

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| SCAN ORDER | P1 | P4 | P3 | P2 | P5 | P6 | P7 | P9 | P8 | P10 | P11 | P12 | P13 | P14 | P15 |
| SCAN TOTAL (ACCUMULATED NON-ZERO INFORMATION) | 41 | 38 | 35 | 36 | 32 | 27 | 26 | 24 | 23 | 22 | 23 | 14 | 11 | 10 | 5 |

FIG.7
(PRIOR ART)

REPLACEMENT #1
OF REVERSED PART

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| SCAN ORDER | P1 | P4 | P2 | P3 | P5 | P6 | P7 | P9 | P8 | P11 | P10 | P12 | P13 | P14 | P15 |
| SCAN TOTAL (ACCUMULATED NON-ZERO INFORMATION) | 41 | 38 | 36 | 35 | 32 | 27 | 26 | 24 | 23 | 22 | 23 | 14 | 11 | 10 | 5 |

FIG.8
(PRIOR ART)

REPLACEMENT #2
OF REVERSED PART

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| SCAN ORDER | P1 | P4 | P2 | P3 | P5 | P6 | P7 | P9 | P8 | P11 | P10 | P12 | P13 | P14 | P15 |
| SCAN TOTAL (ACCUMULATED NON-ZERO INFORMATION) | 41 | 38 | 36 | 35 | 32 | 27 | 26 | 24 | 23 | 23 | 22 | 14 | 11 | 10 | 5 |

IMAGE ENCODING APPARATUS AND METHOD

PRIORITY

This application claims priority under 35 U.S.C. §119(a) to a Japanese Patent Application filed in the Japanese Patent Office on Dec. 16, 2010 and assigned Serial No. JP 281037/2010, the contents of which are incorporated herein by reference.

BACKGROUND OF THE INVENTION

1. Field of the Invention

The present invention relates to a Joint Photographic Experts Group Extended Range (JPEG-XR)-based image encoding method and an image encoding apparatus for realizing the same.

2. Description of the Related Art

JPEG-XR, a standard format for handling image data, was internationally standardized in 2009 to compensate for the lack of color information in JPEG. An image encoding apparatus or an image encoding sequence for converting raw image data into an encoded stream by JPEG-XR is shown in FIG. 1.

A digital input image captured by an imaging device is segmented into two-dimensional (2D) blocks. Data of each block undergoes orthogonal conversion from color-space data into a conversion coefficient in the frequency space. If necessary, the conversion coefficient may undergo quantization. When a data pattern of an image exists over multiple blocks, the strength of the conversion coefficient may be further reduced by predicting the quantized conversion coefficient within a frame according to each frequency band.

The 2D conversion coefficient having undergone quantization and coefficient prediction is rearranged in one-dimensional (1D) data such that a significant coefficient may continue forward and a run (zero) may continue backward. An encoded stream is created by entropy-encoding the rearranged 1D data.

The JPEG-XR image encoding scheme capable of changing a quantized value or a coefficient prediction method for each block may change a scan order for each block.

According to the JPEG-XR standard, the detailed structure and sequence of a scan converter for changing the scan order are as shown in FIGS. 2 and 3, respectively.

An operation thereof will be described in detail with reference to FIGS. 4 to 9.

A conversion coefficient corresponding to, for example, a 4×4 pixel shown in FIG. 4 may be considered as a data block, which is a processing unit.

The data block is a set of data corresponding to a pixel, and the upper left data is excluded. A value of each data represents a significant coefficient. As shown in the drawings, a data position (hereinafter block position) in the data block is represented by Pj (where j=1~15).

FIG. 5 illustrates accumulated non-zero information (herein, a value obtained by uniformly accumulating significant coefficients as 1) of data for each block position in a previously scanned data block. This is a scan state, and represents an evaluation function for determining a scan order. The lower the scan order, the greater its value. In FIG. 5, the scan order is represented in block position.

It is assumed herein that a data block having the values shown in FIG. 6 is input.

Then, the scan converter converts only a coefficient of a block position (i.e., a data value), which is non-zero, into 1, and sequentially adds the converted coefficient to the accumulated non-zero information in the scan order. In this manner, the accumulated non-zero information may be updated as shown in FIG. 7.

Next, the scan converter individually compares values of block positions, which are adjacent to each other in scan order, in the accumulated non-zero information. The values are sequentially replaced to be in descending order (see FIGS. 8 and 9) when there exists a part where the values are in ascending order (the shaded parts in FIG. 7.

The order of block positions when all comparisons and replacements are completed (i.e., the scan order shown in FIG. 9) represents the scan order of the following input data block.

Therefore, the above structure cannot sequentially handle the data block because the scan order of the following data block is determined after the conversion of the preceding data block is completed. Thus, the processing is delayed after the scan conversion, and a digital camera is unable to increase its consecutive photographing speed to a desired value or more.

In order to solve this problem, Japanese Patent Publication No. 2010-193097 discloses that a parallel processing determination unit determines whether the scan order is unchanged as a result of the input of two successive data blocks, and if so, the parallel processing determination unit performs parallel processing in scan order. When there is a change in scan order, the parallel processing determination unit performs the conventional sequential processing.

However, a substantial improvement in processing speed does not result, because the processing speed is improved only when the scan order is unchanged.

If the amount of data block is increased to improve the processing speed by increasing the degree of parallelism, the scan order is likely to be changed, making it difficult to ensure the high processing speed.

SUMMARY OF THE INVENTION

An aspect of an embodiment of the present invention is to provide a JPEG-XR image encoding apparatus and method for changing a quantized value or a coefficient prediction method for each block, thereby dramatically improving a processing speed thereof while ensuring image quality.

In accordance with one aspect of the present invention, there is provided an image encoding apparatus including a scan converter for receiving a data block including pieces of data set to correspond to pixel positions of a segmented image block, and scanning the data in the received data block in a scan order represented in a pixel position order of the pieces of data, a scan state holder for accumulating non-zero information of each piece of data in the received data block in accumulated non-zero information obtained by accumulating non-zero information of each piece of data in the previously received data block for each pixel position, and updating and holding the accumulated non-zero information for each pixel position, and a scan order holder for searching for the updated accumulated non-zero information for every pixel position in the scan order when there is a part where a value thereof is ascending (or descending), and determining and holding a new scan order used in a following data block by replacing a scan order of two ascending (or descending) pieces of accumulated non-zero information.

In accordance with another aspect of the present invention, there is provided an image encoding method including a scan conversion process for receiving a data block including pieces of data set to correspond to pixel positions of a segmented image block, and scanning each piece of data in the received data block in a scan order represented in an order of a pixel position thereof, a scan state holding process for accumulating non-zero information of each piece of data in the received data block in accumulated non-zero information obtained by accumulating non-zero information of each data in the previously received data block for each pixel position, and updating and holding the accumulated non-zero information for each pixel position, and a scan order holding process for searching for the updated accumulated non-zero information for every pixel position in the scan order when there is a part where a value thereof is ascending (or descending), and determining and holding a new scan order used in a following data block by replacing a scan order of two ascending (or descending) pieces of accumulated non-zero information.

BRIEF DESCRIPTION OF THE DRAWINGS

The above and other aspects, features and advantages of embodiments of the present invention will be more apparent from the following description taken in conjunction with the accompanying drawings, in which:

FIG. 4 illustrates a structure of a data block;

FIG. 5 illustrates a scan order and accumulated non-zero information in a certain state;

Figure 6:
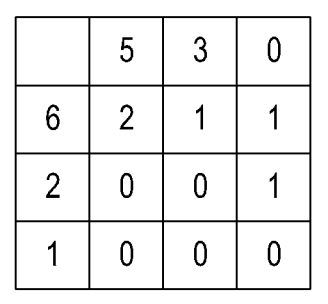

FIG. 6 illustrates values of a data block;

FIG. 7 illustrates state transition of a scan order and accumulated non-zero information changed by an input of data block;

FIG. 8 illustrates state transition of a scan order and accumulated non-zero information changed by an input of data block;

FIG. 9 illustrates state transition of a scan order and accumulated non-zero information changed by an input of data block;

Throughout the drawings, the same drawing reference numerals will be understood to refer to the same elements, features and structures.

DETAILED DESCRIPTION OF EMBODIMENTS OF THE INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

Figure 1:
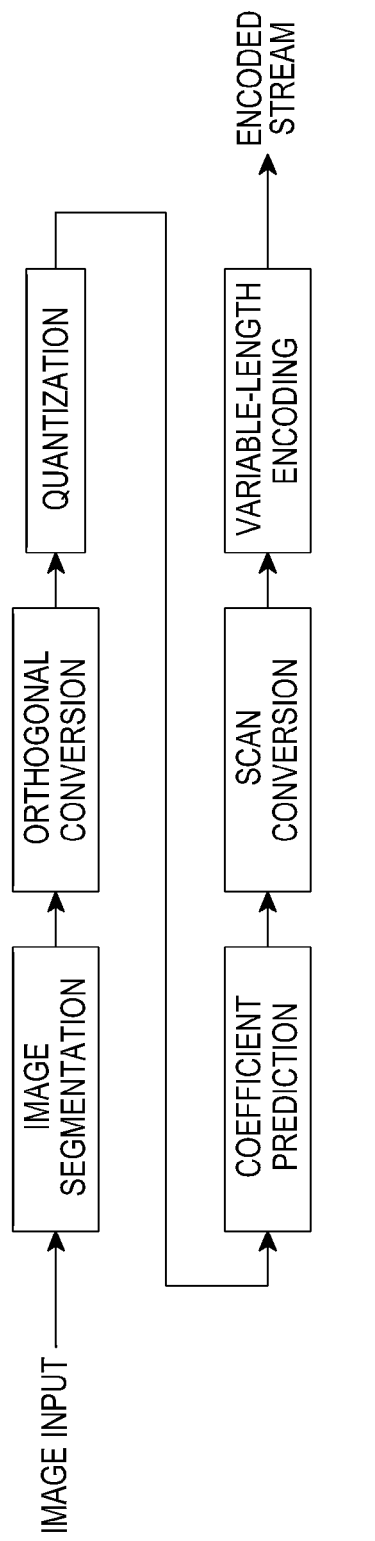
FIG. 1 illustrates the entire structure of an image encoding apparatus or an image encoding sequence for converting raw image data into an encoded stream by JPEG-XR.
Figure 2:
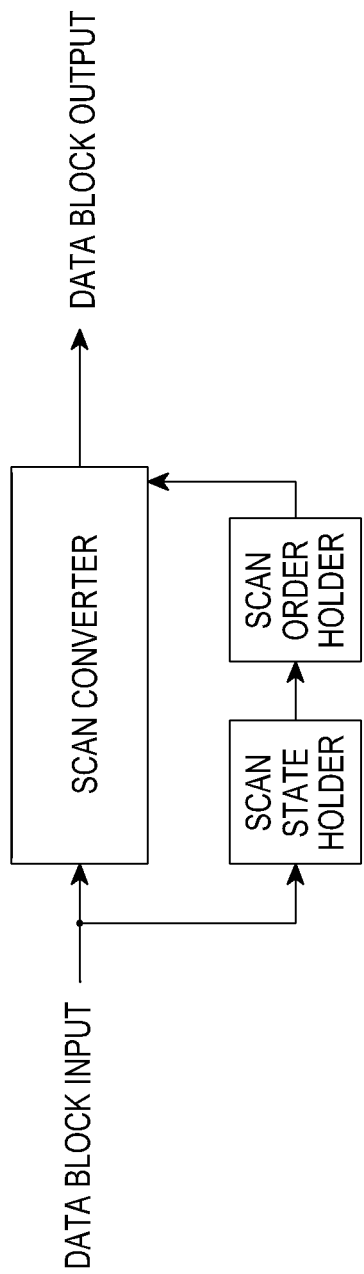
FIG. 2 illustrates a detailed structure of a scan converter in the image encoding apparatus.
Figure 3:
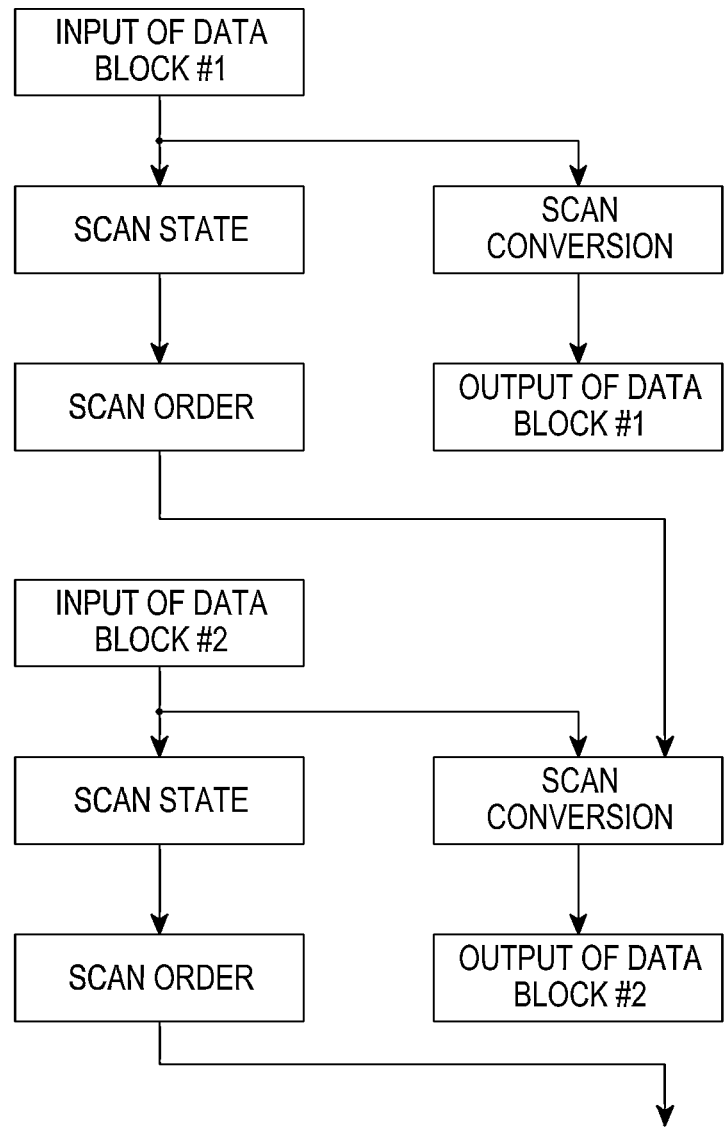
FIG. 3 illustrates a detailed sequence of a scan converter in the image encoding apparatus.
Figure 10:
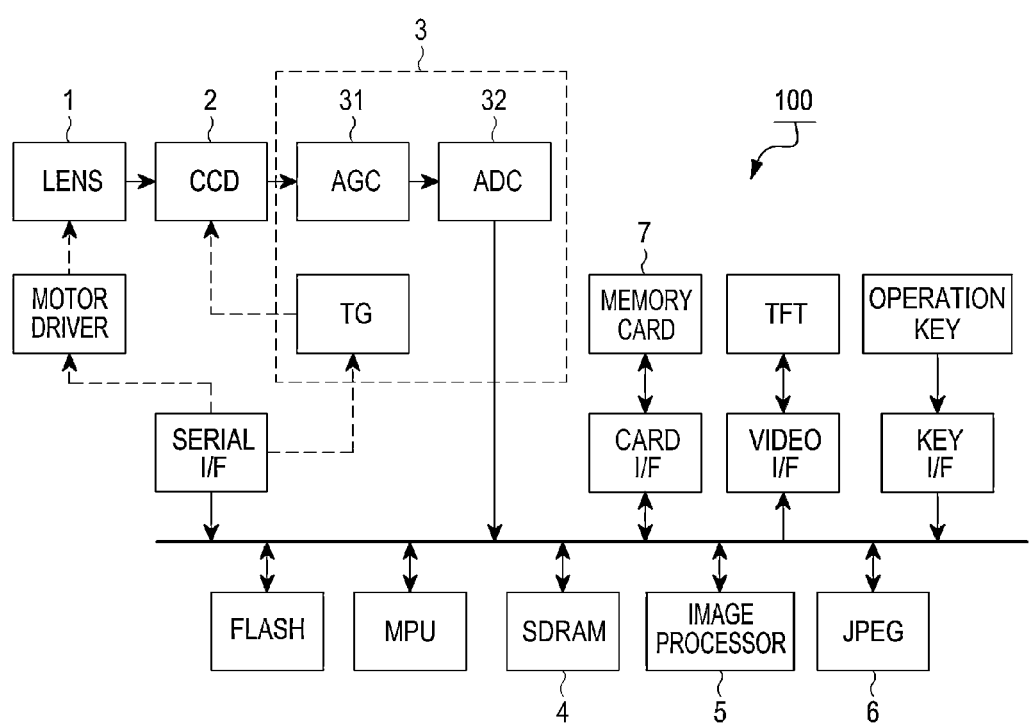
FIG. 10 illustrates the structure of a digital camera to which an image encoding apparatus is applied according to an embodiment of the present invention.

The disclosed image processing apparatus may be mounted, for example, in a digital camera, which will be described with reference to FIG. 10.

In the digital camera 100, a subject is imaged on a Charge-Coupled Device (CCD) 2 through a lens 1, and the image signal is sent as an electrical signal to an analog front-end 3, where an input signal is amplified by an Automatic Gain Controller (AGC) 31 and then converted into a digital signal by an Analog-to-Digital Converter (ADC) 32.

The image (Bayer array raw image) converted into a digital signal is preserved in a memory 4 such as a Synchronous Dynamic Random Access Memory (SDRAM).

The Bayer array raw image preserved in the memory 4 is converted into a YCbCr image in an image processor 5 and then sequentially sent to an image compressor 6 (or image encoding apparatus), in which the received image is encoded, for example, in JPEG format. The encoded compressed image is memorized in a memory card 7.

Figure 11:
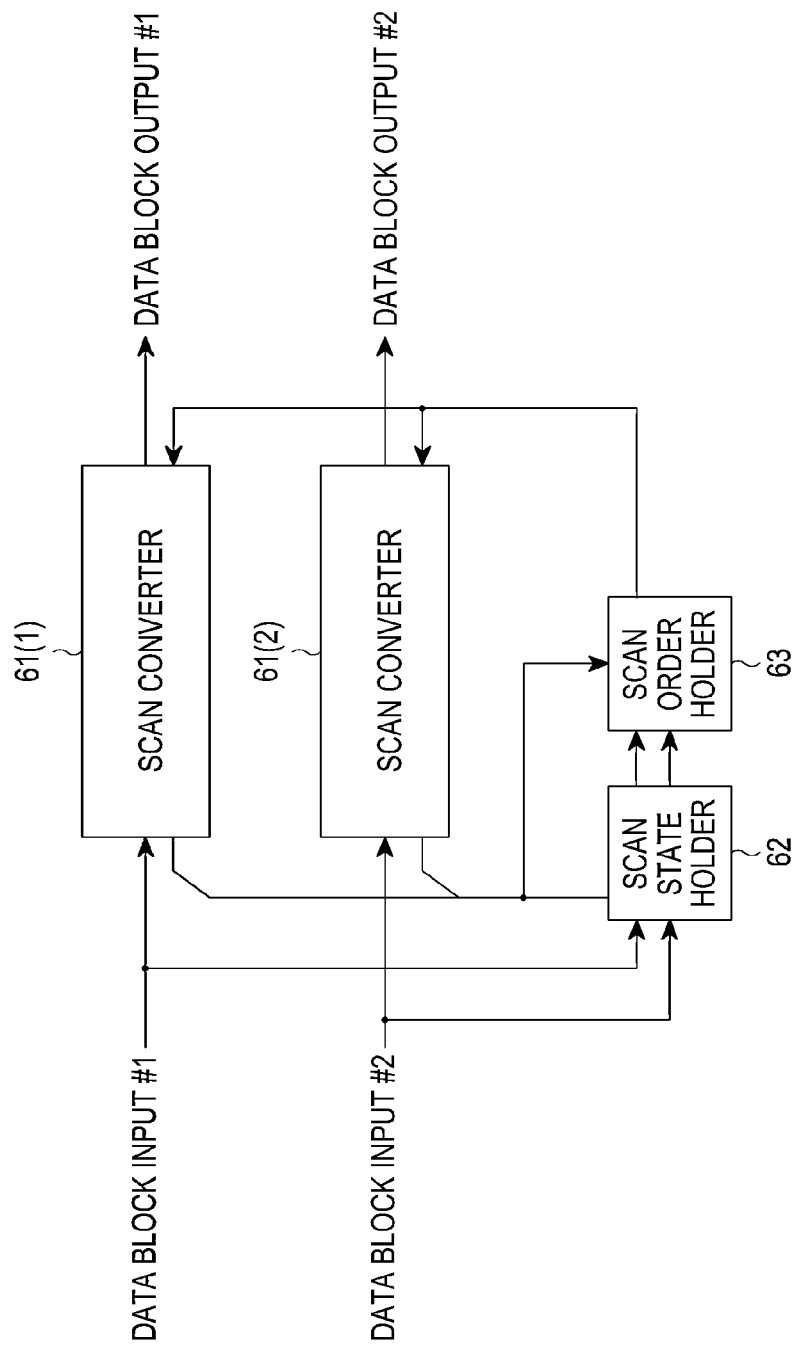
FIG. 11 illustrates the structure of an image encoding apparatus according to an embodiment of the present invention.

FIG. 11 illustrates the structure of an image encoding apparatus according to an embodiment of the present invention. The image compressor 6 may be realized by both hardware and software, and may include a scan converter 61, a scan state holder 62 and a scan order holder 63.

The scan converter 61 receives a data block including a plurality of pieces of data set to correspond to pixel positions of a segmented image block, and scans each data in the received data block in a scan order represented in order of its pixel position (hereinafter block position).

The scan state holder 62 accumulates non-zero information of each piece of data in a received data block in the accumulated non-zero information calculated by accumulating non-zero information of each piece of data in the previously received data block for each pixel position, updates the accumulated non-zero information for each pixel position, and holds the updated accumulated non-zero information in the memory 4.

The scan order holder 63 searches for the updated accumulated non-zero information for every pixel position in the scan order, and if there is a part of the scan order where the scan order value of the accumulated non-zero information is in ascending order (or descending), the scan order holder 63 determines and holds a new scan order used in a following data block by replacing the scan order of the two pieces of ascending (or descending) accumulated non-zero information.

The image compressor 6 includes two scan converters 61, in which a first scan converter 61-1 is configured to receive a preceding data block, whereas a second scan converter 61-2 is configured to receive a following data block.

Figure 12:
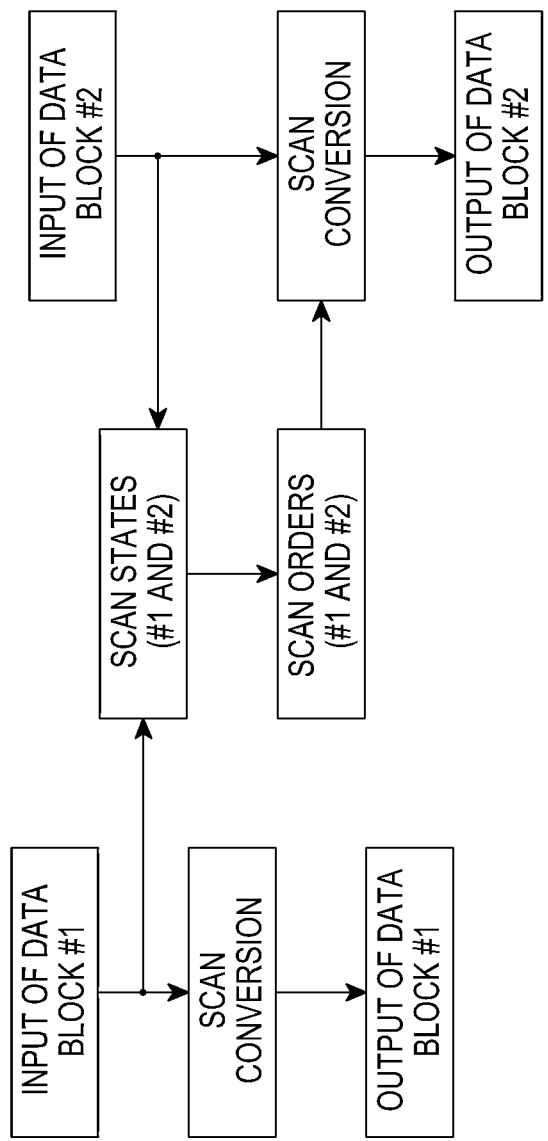
FIG. 12 illustrates an operation of an image encoding apparatus according to an embodiment of the present invention.
Figure 13:
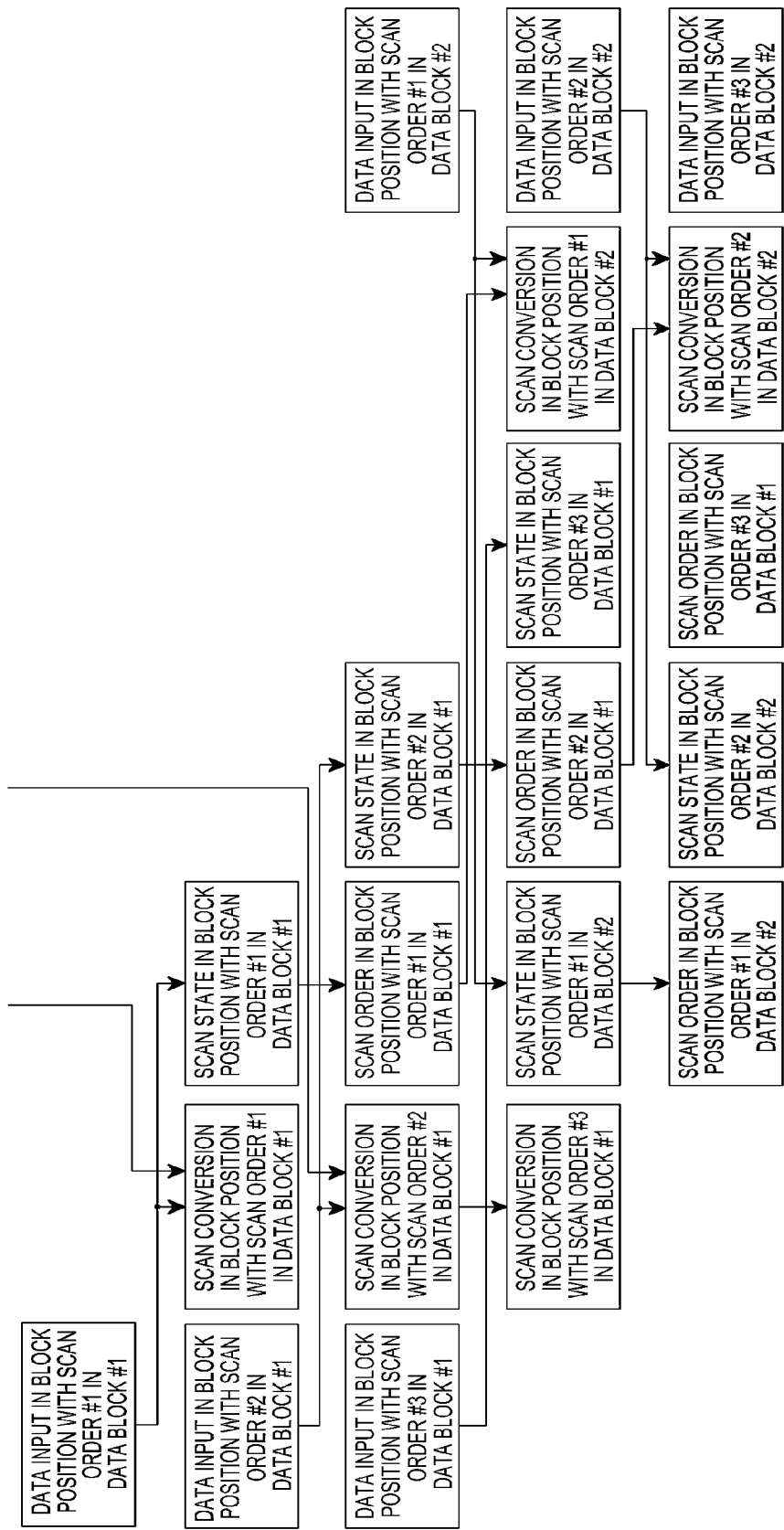
FIG. 13 illustrates a partial operation of an image encoding apparatus according to an embodiment of the present invention.

As shown in FIGS. 12 and 13, the scan state holder 62 sequentially updates accumulated non-zero information based on the preceding data block. If the scan order holder 63 partially determines a new scan order for a following data block based on the updated accumulated non-zero information of a part, the scan state holder 62 acquires data corresponding to the block position of the part for which the scan order is determined, from the following data block, and updates accumulated non-zero information in the block position of the scan order—determined part, and the scan order holder 63 partially determines a new scan order for a following data block based on the updated accumulated non-zero information of the scan order-determined part.

It is assumed in the drawing that the term 'scan state' indicates an operation of the scan state holder 62, the term 'scan conversion' indicates an operation of the scan converter 61, and the term 'scan order' indicates an operation of the scan order holder 63.

FIG. 12 illustrates an operation of an image encoding apparatus according to an embodiment of the present invention in which two data blocks have undergone pipeline processing on a block position basis. Data block #2 is received with a delay time shorter than a one-block time, so the processing of the scan state and scan order may be simultaneously performed, and pipeline processing is performed as the block position-based processing. A description thereof is made with reference to FIG. 13.

Processing of a data block is divided into processing for individual block positions P1 to P15. FIG. 13 illustrates a process in which from the left block, the data block is divided into:

"input of data block #1,"

"scan conversion in block positions with scan orders #1, #2, . . . in data block #1,"

"processing of scan state and scan order in a block position with a scan order #1 in data block #1, #2, . . . ,"

"processing of scan state and scan order in a block position with a scan order #2 in data block #1, #2, . . . ,"

"processing of scan state and scan order in a block position with a scan order #3 in data block #1, #2, . . . ,"

"scan conversion in block positions with scan orders #1, #2, . . . in data block #2," and "input of data block #2", and time elapses by a block positioned under any block.

For example, data in a block position with a scan order #1 in data block #1 undergoes scan conversion, and processing of scan state and scan order after being received.

Data block #2 is received with a two-processing delay and data in a block position with scan order #1 of the data block #2 is received. Thus, scan order information of the data block #1 is required during scan conversion processing, but generation of the information is completed by processing of a scan order of the data block #1 two cycles previous.

Therefore, scan conversion is possible by the input timing. Block positions after a scan order #2, due to undergoing pipeline processing, may be processed in the same manner as the block positions with the scan order #1.

FIG. 13 illustrates separate processing of scan state and scan order. Since scan state and scan order may be processed simultaneously, data block #2 may undergo the above processing even though it is received one cycle after the data block #1.

Figure 14:
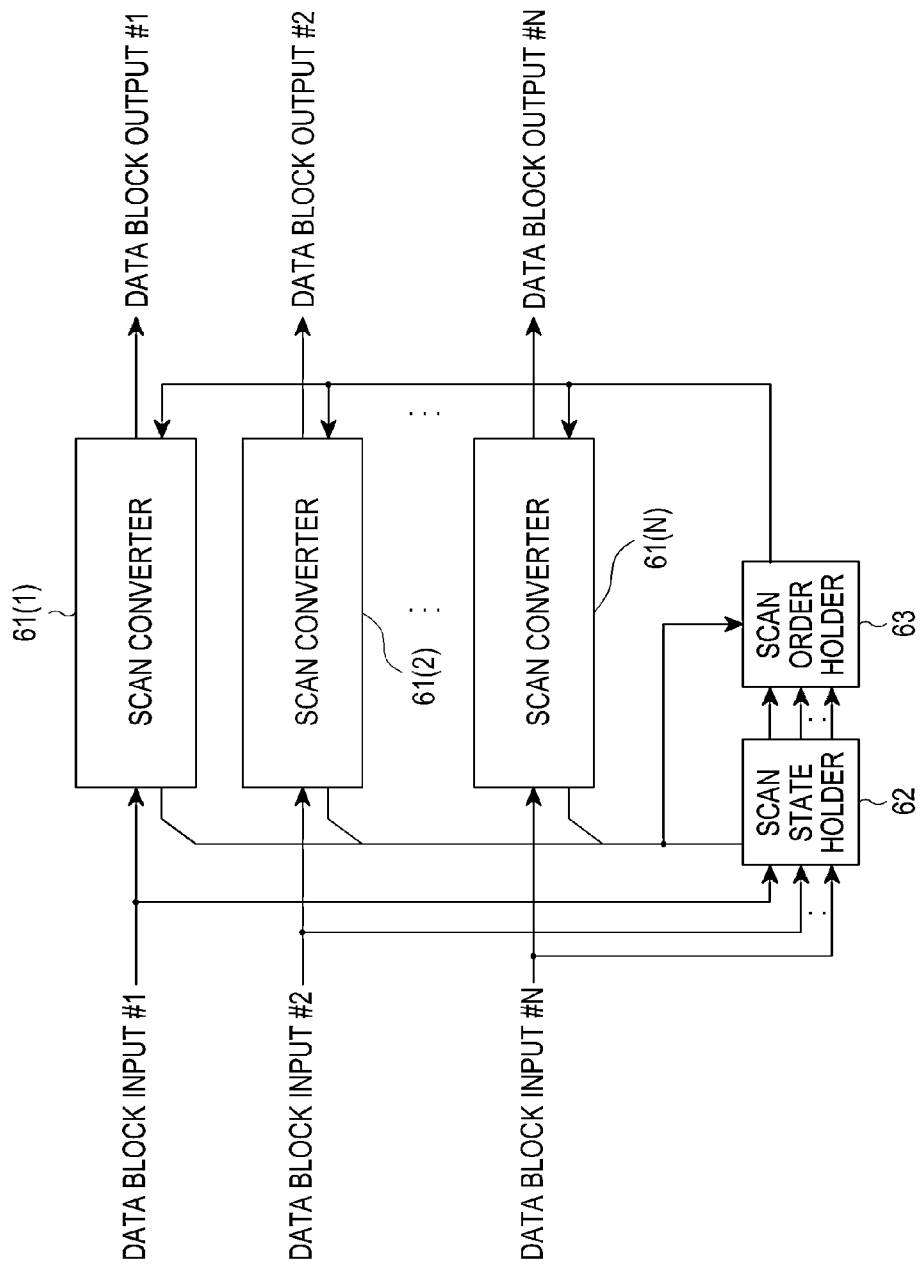
FIG. 14 illustrates the structure of an image encoding apparatus according to another embodiment of the present invention.

FIG. 14 illustrates the structure of an image encoding apparatus according to another embodiment of the present invention.

In this embodiment, the image encoding apparatus includes N scan converters 61 (61-1 to 61-N) to have the block position-based pipeline processing correspond to N data blocks, and includes a scan state holder 62 for outputting N scan states for N inputs. In addition, the image encoding apparatus includes a scan order holder 63 for outputting a scan order for N scan states.

Figure 15:
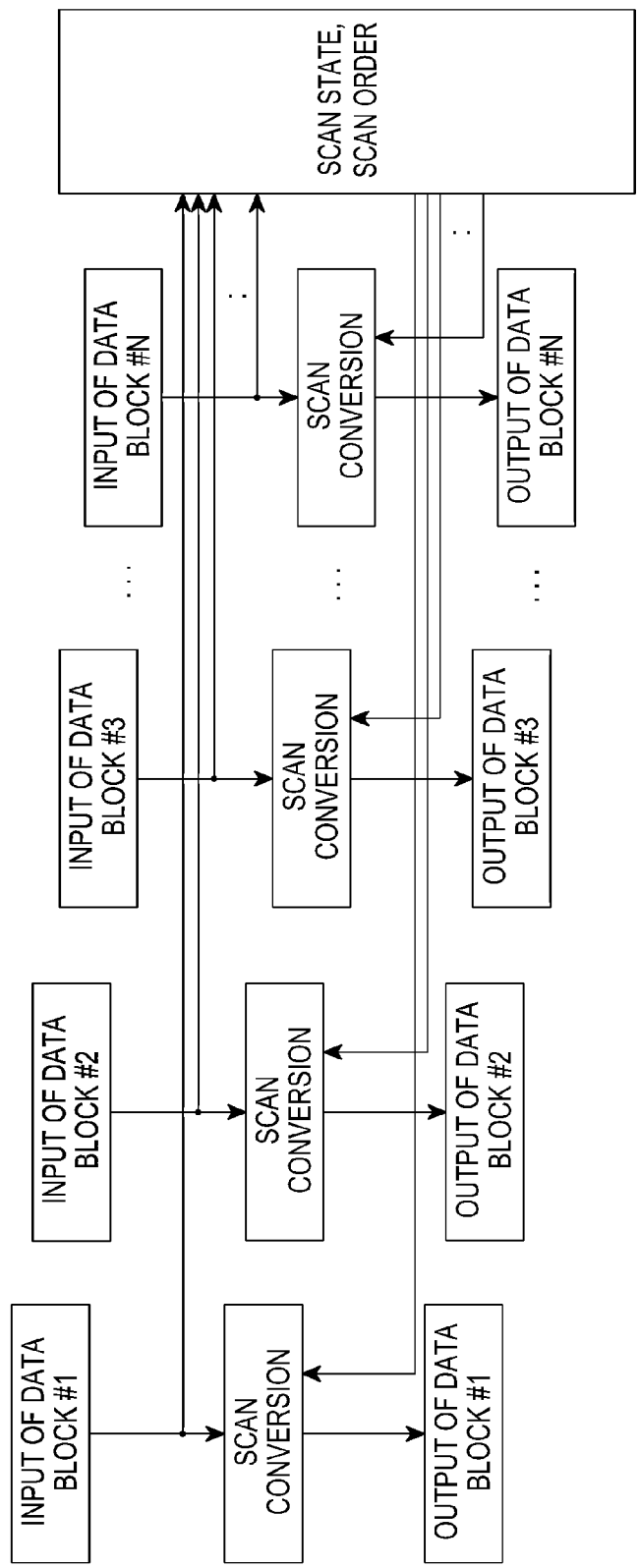
FIG. 15 illustrates an operation of an image encoding apparatus according to another embodiment of the present invention.
Figure 16:
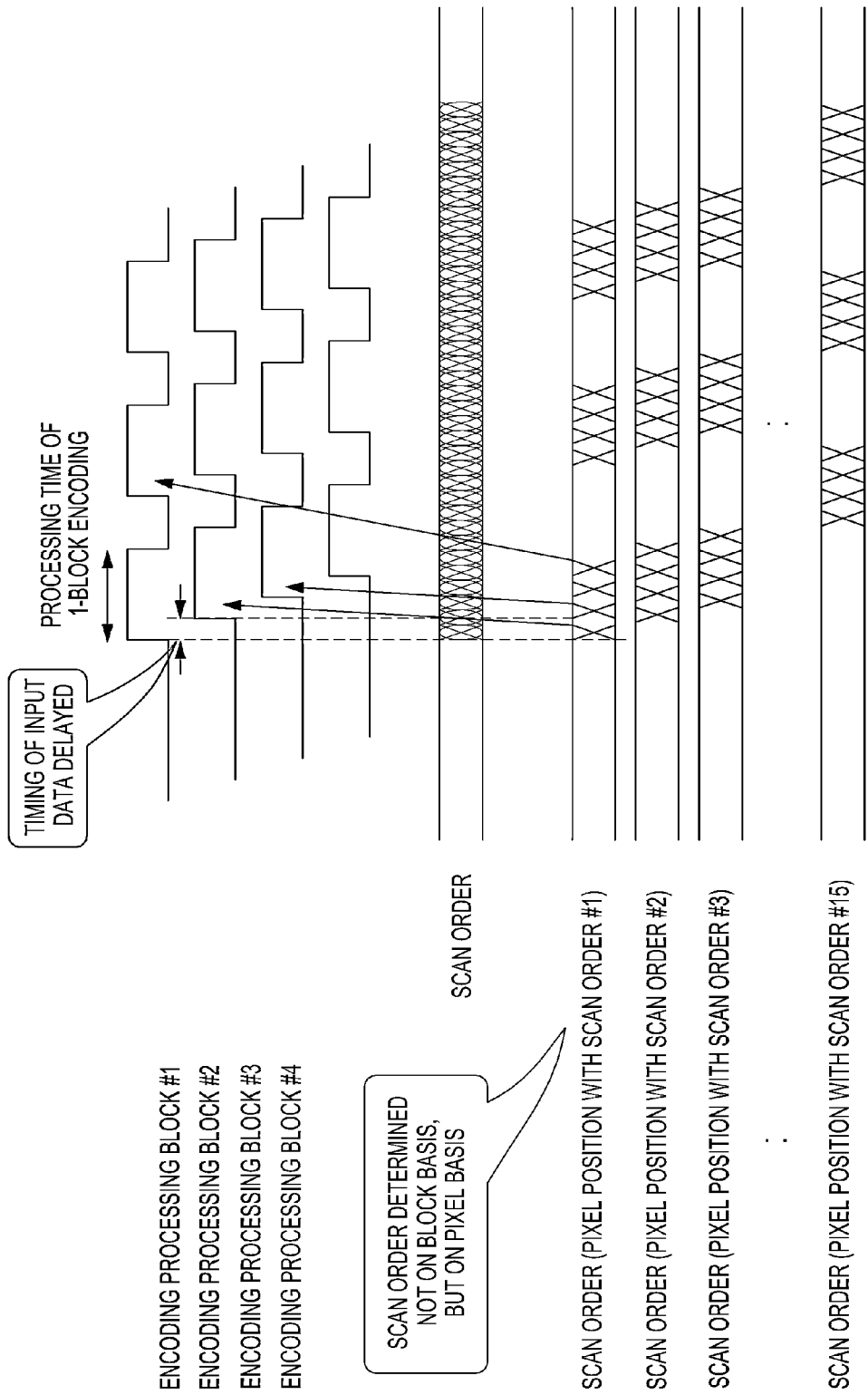
FIG. 16 is a timing chart for the operation of an image encoding apparatus according to FIG. 15.

FIG. 15 illustrates a flowchart of processing N data blocks, and FIG. 16 illustrates a timing chart of the process of FIG. 15.

Scan conversion may be performed with the scan order having been processed with a preceding data block by extending the block position-based pipeline processing to an N-data block input, delaying input timing of each data block input by small increments, and performing scan state and scan order processing.

As can be understood from the timing chart in FIG. 16, the flowchart of FIG. 15 performs processing of N data blocks in parallel almost simultaneously. The processing speed is highest, if N is equal to or less by 1 than the number of pieces of data in the data block.

As is apparent from the foregoing description, the image processing apparatus may perform pipeline processing for scan conversion of the following data block without waiting for the full scan conversion of the preceding data block, making it possible to considerably improve the conversion processing speed, for example, the consecutive photographing speed of the digital camera, and to enable fast Visible Light Communication processing. In addition, image encoding processing is performed on a data block basis according to the standard, thus preventing image degradation.

While the invention has been shown and described with reference to certain embodiments thereof, it will be understood by those skilled in the art that various changes in form and details may be made therein without departing from the spirit and scope of the invention as defined by the appended claims and their equivalents. For example, the present invention may be applied to a similar image encoding method other than the JPEG-XR image encoding method.

What is claimed is:

1. An image encoding apparatus comprising:
  a scan converter for receiving a data block including a plurality of pieces of data set to correspond to pixel positions of a segmented image block, and scanning each piece of data in the received data block in a scan order represented in an order of a pixel position of the pieces of data;
  a scan state holder for accumulating non-zero information of each piece of data in the received data block in accumulated non-zero information obtained by accumulating non-zero information of each piece of data in a previously received data block for each pixel position, and updating and holding the accumulated non-zero information for each pixel position; and
  a scan order holder for searching for the updated accumulated non-zero information for every pixel position in the scan order, and when there is a part of the scan order where a value of the updated accumulated non-zero information is ascending, determining and holding a new scan order used in a following data block by replacing a scan order of two ascending pieces of accumulated non-zero information;
  wherein a plurality of the scan converters are provided, in which a first scan converter is configured to receive a preceding data block and a second scan converter is configured to receive a following data block, the scan state holder sequentially updates accumulated non-zero information based on the preceding data block, and when the scan order holder partially determines a new scan order for a following data block based on a part of the updated accumulated non-zero information the scan state holder acquires data corresponding to a pixel position associated with the determined new scan order, from the following data block and updates accumulated non-zero information in the pixel position associated with the new scan order, and the scan order holder partially re-determines a new scan order for a following data block based on the updated accumulated non-zero information in the pixel position associated with the new scan order.

2. The image encoding apparatus of claim 1, wherein the image encoding apparatus is applied to Joint Photographic Experts Group Extended Range (JPEG-XR) image encoding.

3. The image encoding apparatus of claim 1, wherein the number of the scan converters corresponds to the number of pieces of data constituting a data block.

4. The image encoding apparatus of claim 1, wherein when there is a part of the scan order where a value of the updated accumulated non-zero information is descending, the scan order holder determines and holds a new scan order used in a following data block by replacing a scan order of two descending pieces of accumulated non-zero information.

5. An image encoding method comprising:
- a scan conversion step of receiving a data block including a plurality of pieces of data set to correspond to pixel positions of a segmented image block, and scanning each piece of data in the received data block in a scan order represented in an order of a pixel position of the pieces of data;
- a scan state holding step of accumulating non-zero information of each piece of data in the received data block in accumulated non-zero information obtained by accumulating non-zero information of each piece of data in the previously received data block for each pixel position, and updating and holding the accumulated non-zero information for each pixel position; and
- a scan order holding step of searching for the updated accumulated non-zero information for every pixel position in the scan order, and when there is a part of the scan order where a value of the updated accumulated non-zero information is ascending, determining and holding a new scan order used in a following data block by replacing a scan order of two pieces of ascending accumulated non-zero information;
- wherein parallel scan conversion is performed, in which a preceding data block is received in a first scan conversion and a following data block is received in a second scan conversion; and
- wherein accumulated non-zero information is sequentially updated based on the preceding data block, a new scan order for a following data block is partially determined based on a part of the updated accumulated non-zero information data corresponding to a pixel position associated with the determined new scan order is acquired from the following data block, accumulated non-zero information in the pixel position associated with the determined new scan order is updated, and a new scan order for a following data block is partially re-determined based on the updated accumulated non-zero information in the pixel position associated with the new scan order.

6. The image encoding method of claim 5, wherein the image encoding method is applied to Joint Photographic Experts Group Extended Range (JPEG-XR) image encoding.

7. The image encoding method of claim 5, wherein the number of the scan conversion processes corresponds to the number of pieces of data constituting a data block.

8. The image encoding method of claim 5, wherein when there is a part of the scan order where a value of the updated accumulated non-zero information is descending, the scan order holder determines and holds a new scan order used in a following data block by replacing a scan order of two descending pieces of accumulated non-zero information.

* * * * *